(12) United States Patent
Chang et al.

(10) Patent No.: US 9,894,707 B2
(45) Date of Patent: Feb. 13, 2018

(54) METHOD AND APPARATUS FOR DETERMINING ACTIVE TIME OF UE

(71) Applicant: Huawei Technologies Co., Ltd., Shenzhen, Guangdong (CN)

(72) Inventors: Junren Chang, Beijing (CN); Yajuan Li, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 14/962,079

(22) Filed: Dec. 8, 2015

(65) Prior Publication Data

US 2016/0088681 A1  Mar. 24, 2016

Related U.S. Application Data

(63) Continuation of application No. PCT/CN2014/076919, filed on May 7, 2014.

(30) Foreign Application Priority Data

Jun. 9, 2013  (CN) .......................... 2013 1 0231148

(51) Int. Cl.
  *H04B 1/38* (2015.01)
  *H04W 76/04* (2009.01)
  (Continued)

(52) U.S. Cl.
  CPC ..... *H04W 76/048* (2013.01); *H04W 28/0278* (2013.01); *H04W 52/0216* (2013.01);
  (Continued)

(58) Field of Classification Search
  CPC ..... H04W 8/245; H04W 68/00; H04W 68/02; H04W 52/24; H04W 52/50; H04W 52/02; H04W 52/0229; H04M 1/72525
  (Continued)

(56) References Cited

U.S. PATENT DOCUMENTS 6,804,520 B1 * 10/2004 Johansson ......... H04W 72/1252
                                                      370/329
9,036,571 B2 *  5/2015 Frenger ................. H04L 5/0037
                                                      370/329
(Continued)

FOREIGN PATENT DOCUMENTS

CN  101588625 A  11/2009
CN  101606426 A  12/2009
(Continued)

*Primary Examiner* — Dai A Phuong

(57) ABSTRACT

Embodiments of the present invention disclose a method and an apparatus for determining an active time of UE, where the method includes: acquiring extension information of a DTX active time of a base station; and adjusting a DTX active time of the UE according to the extension information, and using an overlapped time between the DTX active time of the UE and a DRX active time of the UE as an active time of the UE for listening on a PDCCH channel. The UE can learn a latest DTX condition according to a change of the DTX on a base station side in a manner of acquiring extension information of a DTX active time of the base station, and therefore can determine a correct active time of the UE with reference to DRX of the UE, thereby ultimately ensuring QoS of the UE.

15 Claims, 6 Drawing Sheets

Acquire extension information of a DTX active time of a base station, where the extension information is used to indicate extension performed by the base station on the DTX active time of the base station  — S401

Adjust a DTX active time of UE according to the extension information, and use an overlapped time between the DTX active time of the UE and a discontinuous reception DRX active time of the UE as an active time of the UE for listening on a physical downlink control channel PDCCH channel, where the DTX active time of the UE is the DTX active time, of the base station, learned by the UE  — S402

(51) Int. Cl.
  *H04W 52/02* (2009.01)
  *H04W 28/02* (2009.01)
  *H04W 72/04* (2009.01)

(52) U.S. Cl.
  CPC ..... *H04W 72/042* (2013.01); *H04W 72/0413* (2013.01); *H04W 76/046* (2013.01); *Y02B 60/50* (2013.01)

(58) Field of Classification Search
  USPC ...... 455/573–574, 436–453; 370/310.2–312, 370/329–334
  See application file for complete search history.

(56) References Cited

U.S. PATENT DOCUMENTS

| | | | |
|---|---|---|---|
| 2008/0176576 A1* | 7/2008 | Diachina | H04W 72/1278 455/450 |
| 2008/0186892 A1 | 8/2008 | Damnjanovic | |
| 2009/0122736 A1 | 5/2009 | Damnjanovic et al. | |
| 2009/0168731 A1* | 7/2009 | Zhang | H04L 1/1854 370/336 |
| 2010/0130137 A1 | 5/2010 | Pelletier et al. | |
| 2010/0157953 A1* | 6/2010 | Christoffersson | H04W 72/1294 370/336 |
| 2011/0212742 A1* | 9/2011 | Chen | H04W 76/048 455/507 |
| 2012/0014361 A1* | 1/2012 | Jung | H04W 76/048 370/338 |
| 2012/0100896 A1* | 4/2012 | Aoyama | H04W 76/048 455/574 |
| 2012/0320810 A1* | 12/2012 | Nourbakhsh | H04W 52/0235 370/311 |
| 2013/0128788 A1* | 5/2013 | Guey | H04W 76/048 370/311 |
| 2014/0003273 A1* | 1/2014 | Dimou | H04W 24/02 370/252 |
| 2016/0174150 A1* | 6/2016 | Comsa | H04W 36/0094 370/311 |
| 2016/0330687 A1* | 11/2016 | Sumasu | H04J 11/005 |
| 2016/0366640 A1* | 12/2016 | Maeda | H04B 7/2643 |
| 2017/0034759 A9* | 2/2017 | Cai | H04L 1/18 |

FOREIGN PATENT DOCUMENTS

| | | |
|---|---|---|
| CN | 101637051 A | 1/2010 |
| CN | 101651848 A | 2/2010 |
| CN | 102257859 A | 11/2011 |
| CN | 102293046 A | 12/2011 |
| CN | 102932822 A | 2/2013 |
| CN | 103024776 A | 4/2013 |
| EP | 2 084 884 B1 | 3/2013 |
| EP | 2 785 112 A1 | 10/2014 |
| WO | 2010078208 A1 | 7/2010 |
| WO | 2013074015 A1 | 5/2013 |
| WO | WO 2013/075651 A1 | 5/2013 |

* cited by examiner

METHOD AND APPARATUS FOR DETERMINING ACTIVE TIME OF UE

CROSS-REFERENCE TO RELATED APPLICATIONS

This application is a continuation of International Application No. PCT/CN 2014/076919, filed on May 7, 2014, which claims priority to Chinese Patent Application No. 201310231148.1, filed on Jun. 9, 2013, both of which are hereby incorporated by reference in their entireties.

TECHNICAL FIELD

Embodiments of the present invention relate to the field of discontinuous transmission (DTX) and discontinuous reception (DRX) technologies, and in particular, to a method and an apparatus for determining an active time of UE.

BACKGROUND

Currently, power consumption reduction and energy saving become an irresistible trend. On one hand, in a conventional 2G or 3G network, a base station generally provides a service to a user by using a carrier in a relatively low frequency band. As smart phones become popular, users raise a higher requirement on a wireless transmission rate. To satisfy the requirement of users, a carrier in a high frequency band with abundant resources needs to be gradually used to provide a service. Because a carrier in a high frequency band covers a small range, a base station using a carrier in a high frequency band is generally referred to as a small-cell base station. A coverage range of a small-cell base station is referred to as a small cell. To save power, 3GPP proposes introduction of a discontinuous transmission (DTX) mechanism, which is intended to reduce power consumption of a small cell in a manner in which a small cell discontinuously sends a physical downlink control channel (PDCCH).

On the other hand, because a base station usually continuously transmits a PDCCH, to reduce power consumption of the UE, a discontinuous reception (DRX) mechanism is introduced to user equipment (UE) in existing Long Term Evolution (LTE), and power consumption of the UE is reduced in a manner in which the UE discontinuously listens on a PDCCH channel.

When UE using a DRX mechanism is located in a small cell using a DTX mechanism, in other words, when these two mechanisms characterized by "discontinuousness" coexist, to adapt to DTX, the UE should not determine an active time (that is, an active time in which the UE performs PDCCH detection) of the UE only according to DRX of the UE, and should take an overlapped time between a DRX active time of the UE and a learned DTX (that is, DTX of the UE) active time of a base station as a time in which the UE should actually work, that is, the active time of the UE. Reference may be made to FIG. 1. In FIG. 1, a high level indicates a DTX/DRX active time of a corresponding base station/corresponding UE, a low level indicates a DTX/DRX inactive time, and areas in which high levels of UE1 and UE2 overlap high levels of the base station, that is, solid lines in the figure, are times in which the UE should work.

However, in practice, coexistence of these two discontinuous mechanisms may bring about a problem. It may be found from FIG. 1 that a phenomenon that the base station enters a DTX sleep time not long after UE1 enters a DRX active time exists. As a result, a work time of the UE may become rather short, thereby affecting quality of service (QoS) of the UE.

SUMMARY

In view of this, an objective of the embodiments of the present invention is to provide a method and an apparatus for determining an active time of UE, so that the UE can learn a change of DTX of a base station, and determine a correct active time of the UE.

An embodiment of the present invention provides a method for determining an active time of UE, where the method includes:

acquiring extension information of a discontinuous transmission DTX active time of a base station, where the extension information is used to indicate extension performed by the base station on the DTX active time of the base station; and adjusting a DTX active time of the UE according to the extension information, and using an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE.

Preferably:
the extension information includes an active time extension time point and active time extension duration; and
the adjusting a DTX active time of the UE according to the extension information includes:
extending the DTX active time of the UE from the active time extension time point, where an extended length is the active time extension duration.

Preferably, the active time extension time point is received by the UE or preconfigured in the UE, and the active time extension duration is received by the UE or preconfigured in the UE.

Preferably, when both the active time extension time point and the active time extension duration are preconfigured in the UE, the adjusting a DTX active time of the UE according to the extension information includes:
extending, according to an extension indicator received by the UE, the DTX active time of the UE from the active time extension time point, where the extended length is the active time extension duration.

Preferably:
the extension information further includes an active time extension direction; and
the extending the DTX active time of the UE from the active time extension time point, where an extended length is the active time extension duration includes:
extending the DTX active time of the UE from the active time extension time point along the active time extension direction, where the extended length is the active time extension duration.

Preferably:
the extension information includes interval duration; and
the adjusting a DTX active time of the UE according to the extension information includes:
after the current DTX active time of the UE ends, entering, by the UE, a next DTX active time of the UE again after an interval of the interval duration.

Preferably, when the UE acquires the extension information or the extension indicator in a receiving manner, the receiving manner includes:

receiving in a manner of receiving a Media Access Control MAC control element; or receiving in a manner of receiving a radio resource control RRC message; or receiving in a manner of receiving a physical downlink control channel PDCCH command.

Preferably, the receiving in a manner of receiving a PDCCH command includes:

receiving configuration information, where the configuration information includes a discontinuous transmission-radio network temporary identifier DTX-RNTI that is configured for the UE and that is used to detect a PDCCH command; or preconfiguring, in the UE, a DTX-RNTI that is used to detect a PDCCH command; and detecting a specified PDCCH command according to the DTX-RNTI, where the specified PDCCH command includes the extension information or the extension indicator.

Preferably, before the acquiring extension information of a DTX active time of a base station, the method further includes:

when the base station is in a DTX sleep state, determining whether a specified trigger condition is satisfied; and if the specified trigger condition is satisfied, sending a wake-up message to the base station to request the base station to extend the DTX active time.

Preferably, the specified trigger condition includes:

an uplink buffer status report UL BSR exceeds a specified threshold; or the UE currently needs to initiate a new service having a high quality of service QoS requirement; or a current service of the UE cannot be delayed to a next DTX active time of the base station.

Preferably, the wake-up message includes:

a scheduling request SR signal sent on a physical uplink control channel PUCCH; or a preamble signal sent on a physical random access channel PRACH.

An embodiment of the present invention further provides a method for determining an active time of UE, where the method includes:

1) acquiring a single discontinuous transmission DTX period of a base station, where the single DTX period of the base station includes a DTX active time of the base station and a DTX sleep time of the base station in the period;

2) using an overlapped time between the DTX active time of the base station and a discontinuous reception DRX active time of the UE as an active time of the UE for listening on a physical downlink control channel PDCCH channel; and 3) when a specified time point is reached or within a specified time segment, continuing to perform step 1) to acquire a next DTX period of the base station.

Preferably, the acquiring a single DTX period of a base station includes:

acquiring a single DTX period of the base station in a manner of receiving a Media Access Control MAC control element; or acquiring a single DTX period of the base station in a manner of receiving a radio resource control RRC message; or acquiring a single DTX period of the base station in a manner of receiving a PDCCH command.

Preferably, the acquiring a single DTX period of the base station in a manner of receiving a physical downlink control channel PDCCH command includes:

receiving specified configuration information, where the configuration information includes a DTX-RNTI that is configured for the UE and that is used to detect a PDCCH command; or preconfiguring, in the UE, a DTX-RNTI that is used to detect a PDCCH command; and detecting a specified PDCCH command according to the DTX-RNTI, where the specified PDCCH command includes a single DTX period of the base station.

An embodiment of the present invention further provides a method for determining an active time of UE, where the method includes:

sending, by a base station when having extended a discontinuous transmission DTX active time of the base station, extension information of the DTX active time of the base station to the user equipment UE, so that the UE adjusts a DTX active time of the UE according to the extension information, and uses an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE.

Preferably, the extension information includes one or more of an active time extension time point, active time extension duration, an active time extension direction, and interval duration.

Preferably, the sending extension information of the DTX active time of the base station to the user equipment UE includes:

sending the extension information of the DTX active time of the base station in a manner of sending a Media Access Control MAC control element to the user equipment UE; or sending the extension information of the DTX active time of the base station in a manner of sending a radio resource control RRC message to the user equipment UE; or sending the extension information of the DTX active time of the base station in a manner of sending a physical downlink control channel PDCCH command to the user equipment UE.

Preferably, the method further includes:

receiving, by the base station when being in a DTX sleep state, a wake-up message that is sent by the UE; and extending the DTX active time of the base station according to the wake-up message.

Preferably, the method further includes:

sending, by the base station as a micro base station S-eNB to a macro base station M-eNB, a request for configuring DTX for the S-eNB, where after receiving the request, the M-eNB sends DTX configuration information to the S-eNB for configuring DTX for the S-eNB.

Preferably, the request includes: information about a recommended proportional relationship between DTX active duration and DTX sleep duration.

Preferably, the DTX configuration information includes: active duration and sleep duration in a DTX period of the S-eNB, and a parameter value that is used to determine a start time point of the DTX active duration.

Preferably, the method further includes:

sending, by the base station as a micro base station S-eNB to a macro base station M-eNB, a DTX parameter that is configured for the UE, where the M-eNB configures a DRX parameter for the UE according to the DTX parameter that is configured for the UE.

Preferably, the sending, to a macro base station M-eNB, a DTX parameter that is configured by a micro base station S-eNB for the UE includes:

when learning that the UE is served by the S-eNB and the M-eNB simultaneously, sending, by the S-eNB to the M-eNB, the DTX parameter that is configured by the S-eNB for the UE; or sending, by the S-eNB to the M-eNB according to a request of the M-eNB, the DTX parameter that is configured by the S-eNB for the UE; or when the UE is served by the S-eNB and the M-eNB simultaneously, sending, to the M-eNB, the DTX parameter that is configured by the S-eNB for the UE.

An embodiment of the present invention further provides a method for determining an active time of UE, where the method includes:

sending each discontinuous transmission DTX period of a base station to the user equipment UE, where the DTX period includes a DTX active time of the base station and a DTX sleep time of the base station in the period, so that the UE uses an overlapped time between the DTX active time of the base station and a discontinuous reception DRX active time of the UE as an active time of the UE for listening on a physical downlink control channel PDCCH channel.

Preferably, the sending each DTX period of a base station to user equipment UE includes:

sending each DTX period of the base station in a manner of sending a Media Access Control MAC control element to the user equipment UE; or sending each DTX period of the base station in a manner of sending a radio resource control RRC message to the user equipment UE; or sending each DTX period of the base station in a manner of sending a physical downlink control channel PDCCH command to the user equipment UE.

Preferably, the method further includes:

sending, by the base station as a micro base station S-eNB to a macro base station M-eNB, a request for configuring DTX for the S-eNB, where after receiving the request, the M-eNB sends DTX configuration information to the S-eNB for configuring DTX for the S-eNB.

Preferably, the request includes: information about a recommended proportional relationship between DTX active duration and DTX sleep duration.

Preferably, the DTX configuration information includes: active duration and sleep duration in a DTX period of the S-eNB, and a parameter value that is used to determine a start time point of the DTX active duration.

Preferably, the method further includes:

sending, by the base station as a micro base station S-eNB to a macro base station M-eNB, a DTX parameter that is configured for the UE, where the M-eNB configures a DRX parameter for the UE according to the DTX parameter that is configured for the UE.

Preferably, the sending, to a macro base station M-eNB, a DTX parameter that is configured by a micro base station S-eNB for the UE includes:

when learning that the UE is served by the S-eNB and the M-eNB simultaneously, sending, by the S-eNB to the M-eNB, the DTX parameter that is configured by the S-eNB for the UE; or sending, by the S-eNB to the M-eNB according to a request of the M-eNB, the DTX parameter that is configured by the S-eNB for the UE; or when the UE is served by the S-eNB and the M-eNB simultaneously, sending, to the M-eNB, the DTX parameter that is configured by the S-eNB for the UE.

An embodiment of the present invention further provides an apparatus for determining an active time of UE, where the apparatus includes:

an extension information acquiring unit, configured to acquire extension information of a discontinuous transmission DTX active time of a base station, where the extension information is used to indicate extension performed by the base station on the DTX active time of the base station;

a UE DTX adjusting unit, configured to adjust a DTX active time of the UE according to the extension information, where the DTX active time of the UE is the DTX active time of the base station learned by the UE; and a UE active time determining unit, configured to use an overlapped time between the DTX active time of the UE and a discontinuous reception DRX active time of the UE as an active time of the UE for listening on a physical downlink control channel PDCCH channel.

Preferably:

the extension information includes an active time extension time point and active time extension duration; and the UE DTX adjusting unit is specifically configured to extend the DTX active time of the UE from the active time extension time point, where an extended length is the active time extension duration.

Preferably, the active time extension time point is received by the UE or preconfigured in the UE, and the active time extension duration is received by the UE or preconfigured in the UE.

Preferably, when both the active time extension time point and the active time extension duration are preconfigured in the UE, the UE DTX adjusting unit is specifically configured to:

extend, according to an extension indicator received by the UE, the DTX active time of the UE from the active time extension time point, where the extended length is the active time extension duration.

Preferably:

the extension information further includes an active time extension direction; and the UE DTX adjusting unit is specifically configured to:

extend the DTX active time of the UE from the active time extension time point along the active time extension direction, where the extended length is the active time extension duration.

Preferably:

the extension information includes interval duration; and the UE DTX adjusting unit is specifically configured to:

after the current DTX active time of the UE ends, make the UE enter a next DTX active time of the UE again after an interval of the interval duration.

Preferably, the extension information acquiring unit includes:

a MAC receiving subunit, configured to acquire the extension information or the extension indicator in a manner of receiving a Media Access Control MAC control element; or an RRC receiving subunit, configured to acquire the extension information or the extension indicator in a manner of receiving a radio resource control RRC message; or a PDCCH receiving subunit, configured to acquire the extension information or the extension indicator in a manner of receiving a physical downlink control channel PDCCH command.

Preferably, when the PDCCH receiving subunit is included, the PDCCH receiving subunit includes:

a configuration information receiving subunit, configured to receive configuration information, where the configuration information includes a discontinuous transmission-radio network temporary identifier DTX-RNTI that is configured for the UE and that is used to detect a PDCCH command; or a configuration information storage subunit, configured to store a preconfigured DTX-RNTI that is used to detect a PDCCH command; and a detection subunit, configured to detect a specified PDCCH command according to the DTX-RNTI, where the specified PDCCH command includes the extension information or the extension indicator.

Preferably, the apparatus further includes:

an extension request sending unit, configured to: when the base station is in a DTX sleep state, determine whether a specified trigger condition is satisfied; and if the specified trigger condition is satisfied, send a wake-up message to the base station to request the base station to extend the DTX active time.

Preferably, the specified trigger condition includes:

an uplink buffer status report UL BSR exceeds a specified threshold; or the UE currently needs to initiate a new service having a high quality of service QoS requirement; or a current service of the UE cannot be delayed to a next DTX active time of the base station.

Preferably, the wake-up message includes:

a scheduling request SR signal sent on a physical uplink control channel PUCCH; or a preamble signal sent on a physical random access channel PRACH.

An embodiment of the present invention further provides an apparatus for determining an active time of UE, where the apparatus includes:

a single period acquiring unit, configured to acquire a single discontinuous transmission DTX period of a base station, where the single DTX period of the base station includes a DTX active time of the base station and a DTX sleep time of the base station in the period;

a UE active time determining unit, configured to use an overlapped time between the DTX active time of the base station and a discontinuous reception DRX active time of the UE as an active time of the UE for listening on a physical downlink control channel PDCCH channel; and a control unit, configured to: when a specified time point is reached or within a specified time segment, trigger the single period acquiring unit to acquire a next DTX period of the base station.

Preferably, the single period acquiring unit includes:

a MAC receiving subunit, configured to acquire a single DTX period of the base station in a manner of receiving a Media Access Control MAC control element; or an RRC receiving subunit, configured to acquire a single DTX period of the base station in a manner of receiving a radio resource control RRC message; or a PDCCH receiving subunit, configured to acquire a single DTX period of the base station in a manner of receiving a PDCCH command.

Preferably, when the PDCCH receiving subunit is included, the PDCCH receiving subunit includes:

a configuration information receiving subunit, configured to receive configuration information, where the configuration information includes a discontinuous transmission-radio network temporary identifier DTX-RNTI that is configured for the UE and that is used to detect a PDCCH command; or a configuration information storage subunit, configured to store a preconfigured DTX-RNTI that is used to detect a PDCCH command; and a detection subunit, configured to detect a specified PDCCH command according to the DTX-RNTI, where the specified PDCCH command includes a single DTX period of the base station.

An embodiment of the present invention further provides an apparatus for determining an active time of UE, where the apparatus includes:

an extension determining unit, configured to determine whether a base station has extended a discontinuous transmission DTX active time of the base station; and if yes, trigger an extension information sending unit; and the extension information sending unit, configured to send extension information of the DTX active time of the base station to the user equipment UE, so that the UE adjusts a DTX active time of the UE according to the extension information, and uses an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE.

Preferably, the extension information includes one or more of an active time extension time point, active time extension duration, an active time extension direction, and interval duration.

Preferably, the extension information sending unit includes:

a MAC sending subunit, configured to send the extension information of the DTX active time of the base station in a manner of sending a Media Access Control MAC control element to the user equipment UE; or an RRC sending subunit, configured to send the extension information of the DTX active time of the base station in a manner of sending a radio resource control RRC message to the user equipment UE; or a PDCCH sending subunit, configured to send the extension information of the DTX active time of the base station in a manner of sending a physical downlink control channel PDCCH command to the user equipment UE.

Preferably, the apparatus further includes:

an extension triggering unit, configured to: when the base station is in a DTX sleep state, receive a wake-up message that is sent by the UE; and extend the DTX active time of the base station according to the wake-up message.

An embodiment of the present invention provides an apparatus for determining an active time of UE, where the apparatus includes:

a DTX period sending unit, configured to send each discontinuous transmission DTX period of a base station to the user equipment UE, where the DTX period includes a DTX active time of the base station and a DTX sleep time of the base station in the period, so that the UE uses an overlapped time between the DTX active time of the base station and a discontinuous reception DRX active time of the UE as an active time of the UE for listening on a physical downlink control channel PDCCH channel.

Preferably, the DTX period sending unit includes:

a MAC sending subunit, configured to send each DTX period of the base station in a manner of sending a Media Access Control MAC control element to the user equipment UE; or an RRC sending subunit, configured to send each DTX period of the base station in a manner of sending a radio resource control RRC message to the user equipment UE; or a PDCCH sending subunit, configured to send each DTX period of the base station in a manner of sending a physical downlink control channel PDCCH command to the user equipment UE.

In this embodiment of the present invention, when a base station changes original DTX active time of the base station, UE can learn a latest DTX active time condition according to a change of the DTX active time on a base station side in a manner of acquiring extension information of a DTX active time of the base station and therefore can determine a correct active time of the UE with reference to DRX active time of the UE, thereby ultimately ensuring QoS of the UE.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To facilitate comprehensive understanding of the present invention, many specific details are mentioned in the following detailed description, but a person skilled in the art should understand that the present invention may be implemented without these specific details. In other embodiments, a known method, process, component, and circuit are not described in detail, to avoid unnecessary confusion of the embodiments.

Embodiment 1

The following first briefly describes two mechanisms, that is, DTX and DRX.

Figure 1:
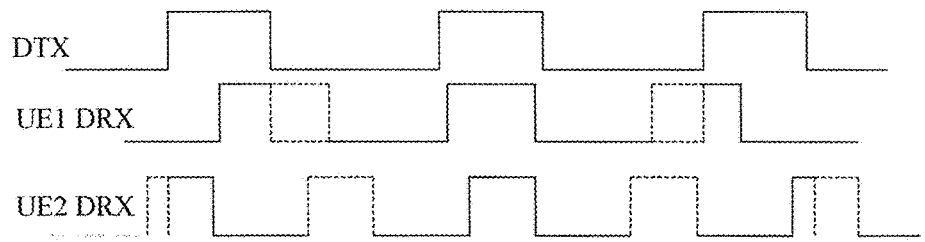
FIG. 1 is a schematic diagram illustrating overlapping between DTX and DRX.
Figure 2:
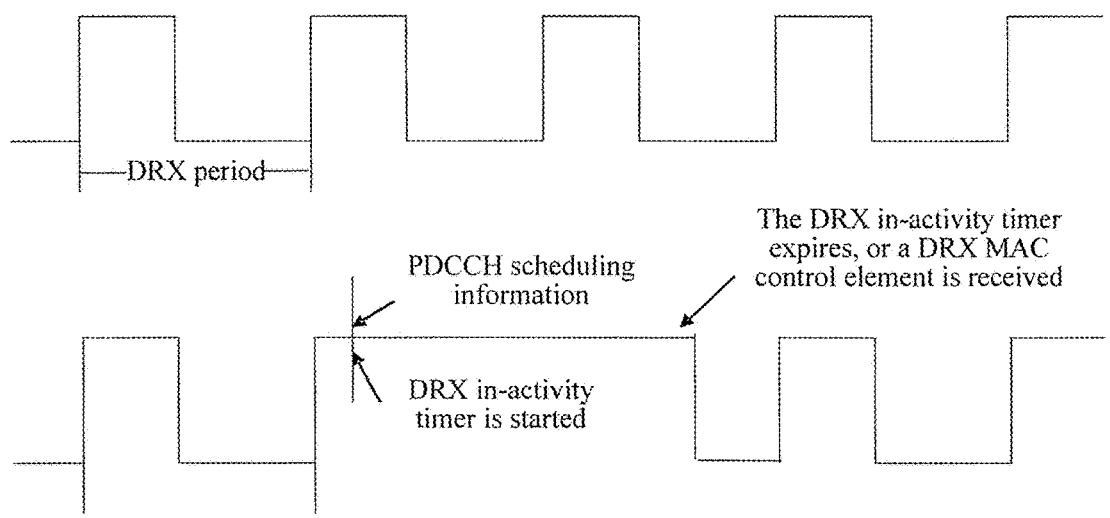
FIG. 2 is a schematic diagram illustrating running of DRX.

FIG. 2 is a schematic diagram of running of DRX of UE. In the figure, a high level indicates a DRX active time, that is, a time in which the UE listens on a PDCCH channel (where in FIG. 2, DTX is not considered; therefore, an active time of the UE is equal to a DRX active time), and a low level indicates a DRX sleep state. Specifically, at an initial stage of a DRX period, the UE first needs to start an onDurationTimer on-duration timer, and within a time of the timer, the UE needs to listen on a PDCCH channel to acquire scheduling information. If the UE does not receive scheduling information within the time of the onDurationTimer, the UE enters a sleep state and stops listening on a PDCCH channel, so as to save power. When the foregoing process is repeated, a diagram of running in the first row in FIG. 2 is formed. If the UE receives scheduling information within the time of the onDurationTimer, the UE needs to start another timer, that is, an inActivityTimer, namely a DRX in-activity timer, each time the UE receives scheduling information. Within a time of the DRX in-activity timer, the UE stays in an active state of listening on a PDCCH channel. Refer to a diagram of running in the second row in FIG. 2. Then, if the DRX in-activity timer expires, or the UE receives a DRX MAC control element that instructs the UE to enter a sleep state, the UE may enter a sleep state.

Figure 3:
FIG. 3 is a schematic diagram illustrating extension of a DTX active time.

FIG. 3 is a schematic diagram of extension of a DTX active time. In the figure, a high level indicates a DTX active time, and a low level indicates a DTX sleep time. In the present invention, a DTX active time is duration for which a DTX active state lasts, and the UE considers that an eNB sends scheduling information on a PDCCH channel during the time; and a DTX sleep time is duration for which a DTX sleep state lasts, and the UE considers that an eNB does not send scheduling information on a PDCCH channel during the time. Usually, after knowing activation duration, sleep duration, and an activation start time point in a single DTX period, the UE can basically know a DTX running state. During specific implementation, the activation start time point may be calculated by using a received DTX start offset. Refer to the following formula:

$$[(SFN \times 10) + \text{Subframe number}] \bmod (DTX \text{ period length}) = (DTX \text{ start offset}) \bmod (DTX \text{ period length}); \text{ or}$$

$$[(SFN \times 10) + \text{Subframe number}] \bmod (DTX \text{ period length}) = (DTX \text{ start offset}).$$

In the foregoing formulas, a radio frame includes 10 subframes, and a DTX period length is activation duration+sleep duration. A subframe satisfying the foregoing formula is a start subframe in which an eNB starts to enter a DTX active state.

Figure 4:
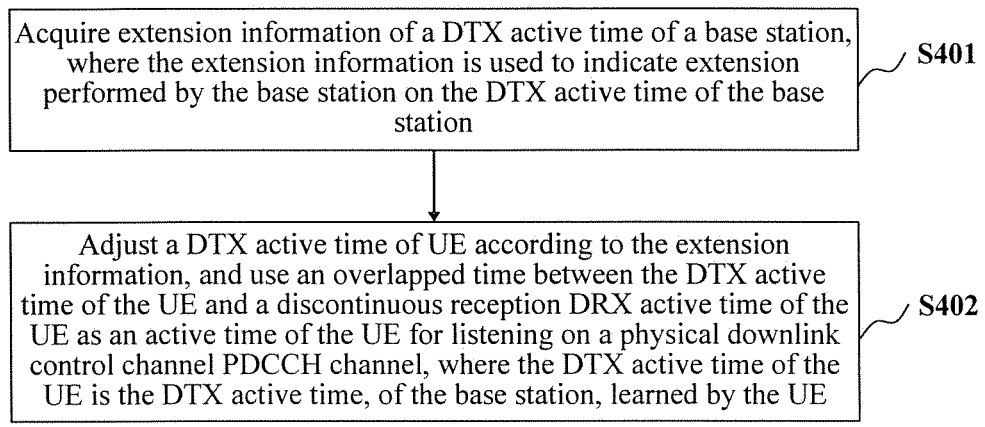
FIG. 4 is a flowchart illustrating a method according to Embodiment 1 of the present invention.

FIG. 4 is a flowchart of a method according to Embodiment 1 of the present invention. This embodiment discloses a method for adjusting a discontinuous transmission DTX running period, where the method is applicable to user equipment UE, and includes:

S401: Acquire extension information of a DTX active time of a base station, where the extension information is used to indicate extension performed by the base station on the DTX active time of the base station. Specific content of the extension information is not limited in this embodiment provided that the extension information can indicate extension performed by the base station on the DTX active time of the base station. In addition, the extension information may be acquired in multiple manners, for example, all the extension information is received from the base station, or a part of the extension information is received from the base station and a part of the extension information is preconfigured in the UE, which is not limited in this embodiment either.

S402: Adjust a DTX active time of the UE according to the extension information, and use an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE. In the present invention, the active time of the UE is a time in which the UE should actually work, that is, a time in which the UE needs to listen on a PDCCH channel. That is, the overlapped time of the DTX active time and the DRX active time should be acquired and used as the active time of the UE. In addition, it should be also noted that DTX exists only on a base station side, to calculate the active time of the UE, the UE also acquires the DTX of the base station, and to distinguish the two types of DTX, that is, the DTX of the base station itself and the DTX, of the base station, learned by the UE, two terms, that is, the DTX of the base station and the DTX of the UE, are separately used in the present invention. Further, when the base station changes the DTX active time of the base station for a reason of ensuring QoS of a current service of the UE or another reason, DTX information, of the UE, currently saved by the UE becomes incorrect; therefore, the UE needs to learn in time a change of DTX of the base station, to obtain correct DTX of the UE and determine a correct active time of the UE.

In this embodiment or another embodiment of the present invention, preferably, the extension information may include one or a combination of parameters that can describe how extension is performed, for example, an active time extension time point (that is, a start point from which an active time is extended), active time extension duration, an active time extension direction, and interval duration. In addition, these parameters are not acquired in a fixed manner, and all the parameters may be sent by the base station to the UE, or some of the parameters are sent by the base station and some of the parameters are preconfigured in the UE, or even all the parameters may be preconfigured in the UE, which is not limited in the present invention. To make this embodiment clearer, the following uses several examples for illustration:

For example:

the extension information may include an active time extension time point and active time extension duration; and correspondingly, the adjusting a DTX active time of the UE according to the extension information may include:

extending the DTX active time of the UE from the active time extension time point, where an extended length is the active time extension duration. In the foregoing case, the base station extends the DTX of the base station itself as follows: at the active time extension time point (for example, a current time point), making DTX enter an active state that lasts for the active time extension duration. After learning two parameters, the UE may make a same adjustment, so that DTX, of the base station, learned by the UE is consistent with the DTX of the base station itself.

As mentioned above, these parameters are not acquired in a fixed manner, and all the parameters may be sent by the base station to the UE, or some of the parameters are sent by the base station and some of the parameters are preconfigured in the UE, or even all the parameters may be preconfigured in the UE. Therefore, preferably:

the active time extension time point is received by the UE or preconfigured in the UE, and the active time extension duration is received by the UE or preconfigured in the UE.

Particularly, when these parameters are preconfigured in the UE, it indicates that the base station and the UE have agreed on both an extension time point and extension duration that are needed during extension; therefore, in this case, the base station may be made to send a triggering instruction such as an extension indicator or add a triggering instruction to another message, and the UE may perform same extension as that performed by the base station. That is:

when both the active time extension time point and the active time extension duration are preconfigured in the UE, the adjusting a DTX active time of the UE according to the extension information includes:

extending, according to an extension indicator received by the UE, the DTX active time of the UE from the active time extension time point, where the extended length is the active time extension duration.

During extension, it may be considered that a default extension direction is a direction along a time axis, facing backward (referring to an arrow pointing to the right in FIG. 3), and sometimes an extension direction may also be a reverse direction (referring to an arrow pointing to the left in FIG. 2). Therefore, in this embodiment or some other embodiments of the present invention, an active time extension direction may also be added as a parameter and combined with the foregoing extension time point and extension duration. That is, the extension information further includes an active time extension direction; and the extending the DTX active time of the UE from the active time extension time point, where an extended length is the active time extension duration includes:

extending the DTX active time of the UE from the active time extension time point along the active time extension direction, where the extended length is the active time extension duration. The extension direction may also be received by the UE or preconfigured in the UE.

In addition to extension of a DTX active time, interval duration between active times, that is, a sleep time, may also be similarly extended. Therefore:

For another example:

the extension information includes interval duration; and correspondingly, the adjusting a DTX active time of the UE according to the extension information includes:

after the current DTX active time of the UE ends, entering, by the UE, a next DTX active time of the UE again after an interval of the interval duration.

In addition, in the foregoing, when it is involved that the base station needs to send the foregoing parameters or instruction to the UE, that is, the UE needs to acquire the extension indicator or the extension information in a manner of receiving instead of preconfiguring, various signaling carrying these parameters or the instruction may exist, which may be dedicated signaling, or may be existing signaling, which is not limited in the present invention. In this embodiment or some other embodiments of the present invention, preferably:

when the UE acquires the extension information or the extension indicator in a receiving manner, the receiving manner includes:

receiving in a manner of receiving a Media Access Control MAC control element; or receiving in a manner of receiving a radio resource control RRC message; or receiving in a manner of receiving a physical downlink control channel PDCCH command. That is, the base station places the extension information or the extension indicator in a MAC CE, an RRC message, or a PDCCH command, and sends the MAC CE, the RRC message, or the PDCCH command to the UE.

Further, preferably, the receiving in a manner of receiving a PDCCH command includes:

receiving configuration information, where the configuration information includes a discontinuous transmission-radio network temporary identifier DTX-RNTI that is configured for the UE and that is used to detect a PDCCH command; or preconfiguring, in the UE, a DTX-RNTI that is used to detect a PDCCH command; and detecting a specified PDCCH command according to the DTX-RNTI, where the specified PDCCH command includes the extension information or the extension indicator.

After the current extension performed by the base station is complete, the UE may make original DTX of the UE, that is, DTX of the UE before extension, continue to be valid until new extension information is received, or repeat extension according to the current manner of extension until new extension information is received.

In addition, in this embodiment or some other embodiments of the present invention, a step of waking up, by the UE, the base station to request the base station to perform extension may be further included. That is:

before the acquiring extension information of a DTX active time of a base station, the method further includes:

when the base station is in a DTX sleep state, determining whether a specified trigger condition is satisfied; and if the specified trigger condition is satisfied, sending a wake-up message to the base station to request the base station to extend the DTX active time.

Preferably, the specified trigger condition includes:

an uplink buffer status report UL BSR exceeds a specified threshold; or the UE currently needs to initiate a new service having a high QoS requirement; or a current service of the UE cannot be delayed to a next DTX active time of the base station.

Preferably, the wake-up message includes:

a scheduling request SR signal sent on a PUCCH; or a preamble signal sent on a PRACH.

Specifically, the UE determines, based on a current uplink buffer state, whether to request an eNB to temporarily enter a DTX active time within a DTX sleep time of the eNB, or actively request an eNB to extend a DTX active time to provide a service to the UE. For example, when the UE detects that a BSR (a buffer state) of the UE already exceeds a threshold, or when the UE detects that a new service having a relatively high QoS requirement needs to be initiated, the UE may actively request to wake up the eNB or request the eNB to extend a DTX active time. Based on a particular preset trigger condition, the UE is triggered to send a wake-up signal or a wake-up request message to the eNB. The trigger condition herein may be that: an UL BSR exceeds a threshold; or the UE currently needs to initiate a new service having a high QoS requirement; or it is estimated that a current service of the UE cannot be delayed to a next DTX active time. In this case, the UE may send a wake-up signal to the eNB to request the eNB to schedule a resource for the UE. The wake-up signal may be an SR signal sent on a PUCCH, or a preamble signal sent on a PRACH, or the like. After detecting the wake-up signal, the eNB may recover from a sleep state, and then schedule a particular resource for the UE on a PUCCH, so that the resource is used by the UE to transmit uplink data.

In this embodiment of the present invention, when a base station changes original DTX of the base station, UE can learn a latest DTX condition according to a change of the DTX on a base station side in a manner of acquiring extension information of a DTX active time of the base station, and therefore can determine a correct active time of the UE with reference to DRX of the UE, thereby ultimately ensuring QoS of the UE.

Embodiment 2

Figure 5:
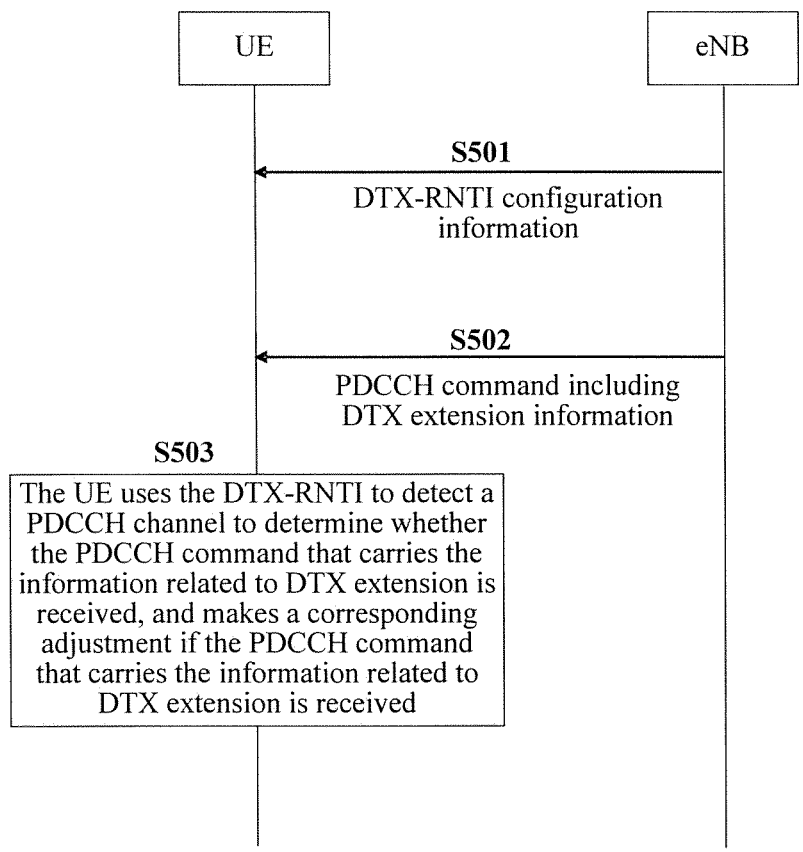
FIG. 5 is a schematic diagram illustrating signaling according to Embodiment 2 of the present invention.

FIG. 5 is a schematic diagram of signaling according to Embodiment 2 of the present invention. This embodiment is based on Embodiment 1, and provides more details about Embodiment 1 with reference to a specific scenario. In this embodiment, a PDCCH command is used as an example. An eNB (which may also be an S-eNB, that is, a small eNB, which are not distinguished in the present invention) notifies, by sending a PDCCH command, UE that DTX is extended on a base station side. After receiving and detecting the PDCCH command, the UE may correspondingly adjust DTX of the UE with reference to some preconfigured information. Specifically, this embodiment may include the following steps:

S501: The eNB sends signaling that includes DTX-RNTI configuration information to the UE, to configure a DTX-RNTI for the UE. This step is equivalent to a preliminary processing step, and the DTX-RNTI is used to enable the UE to identify, from many received PDCCH commands, a PDCCH command that carries information related to DTX extension.

If all UE use a same DTX-RNTI, the DTX-RNTI may also be a preset value, or the DTX-RNTI may be configured for the UE by the eNB by sending a broadcast message.

S502: When the eNB needs to extend DTX, the eNB sends, to the UE, a PDCCH command that is used to carry information related to DTX extension, to instruct the UE to perform extension.

S503: The UE uses the DTX-RNTI to detect a PDCCH channel to determine whether the PDCCH command that carries the information related to DTX extension is received, and makes a corresponding adjustment if the PDCCH command that carries the information related to DTX extension is received. During specific implementation, the PDCCH command may include one or more of the following parameters.

1) Extension Indicator

A DTX active time extension indicator is equivalent to a trigger instruction. After receiving the indicator, the UE starts a preconfigured DTX-extended-timer at a specified time point. The specified time point herein is a start point from which an active time is extended, and may be a current time point, or may be another time point. Within a time segment of the DTX-extended-timer, the UE considers that the eNB still continues to stay in an active state, that is, sends scheduling information on a PDCCH channel. The specified time point and duration of the DTX-extended-timer that are described in this paragraph may be preset values, or may be preconfigured by the eNB for the UE by using higher layer signaling, for example, are sent in step S501 to the UE together with the DTX-RNTI configuration information.

2) DTX Active Time Extension Duration

In this case, it indicates that the PDCCH command is used to notify the UE of specific DTX active time extension duration, and the UE makes, at a specified time point, DTX of the UE enter an active state that lasts for the DTX active time extension duration. Similar to the foregoing, the specified time described in this paragraph may be a current time point or another time point, and may be learned in a manner of preconfiguring the specified time in the UE or configuring the specified time for the UE by using signaling.

3) DTX Extension Reference+Extension Direction

Extension reference is a start point of extension, and may be specifically ending or beginning of an active time in a DTX period. An extension direction may be a direction facing backwards from the ending or facing forwards from the beginning, and reference may be made to the arrow pointing to the right or the arrow pointing to the left in FIG. 3 respectively. Extension duration may be preconfigured in the UE, or may be preconfigured by the eNB for the UE by using higher layer signaling, or may be sent to the UE together with the foregoing DTX extension reference+extension direction.

4) Extension Interval

If the eNB indicates an extension interval in the PDCCH command, after receiving the PDCCH command and after a current DTX active time ends, the UE enters a DTX active state again after an interval of duration of the extension interval indicated by the PDCCH.

In addition, during implementation of this embodiment, some other issues may be further involved, and are described as follows:

Issue of Downlink Retransmission:

If it is estimated that the eNB go to sleep at a time point, and the eNB needs to resend a small amount of data at this time point, the eNB may instruct, during latest PDCCH scheduling, specific UE to extend an active time. That is, if UE does not successfully receive a PDSCH of a current subframe, whether to continue to wait for subsequent retransmission after a normal active time ends needs to be determined based on an instruction of the eNB.

Issue of Uplink Non-Adaptive Synchronous HARQ (Hybrid ARQ) Retransmission:

If the UE needs to perform synchronous uplink HARQ retransmission at a time point closely after ending of an active time, the UE should continue to perform uplink retransmission once, or the UE continues to support uplink retransmission until maximum HARQ retransmission times of a transport block are reached; or the UE does not perform uplink retransmission, saves a current transport block to be retransmitted, and retransmits the transport block when a next active time starts; or the UE does not perform uplink retransmission, and releases a currently buffered transport block.

In this embodiment of the present invention, when a base station changes original DTX of the base station, UE can learn a latest DTX condition according to a change of the DTX on a base station side in a manner of acquiring extension information of a DTX active time of the base station, and therefore can determine a correct active time of the UE with reference to DRX of the UE, thereby ultimately ensuring QoS of the UE.

Embodiment 3

Figure 6:
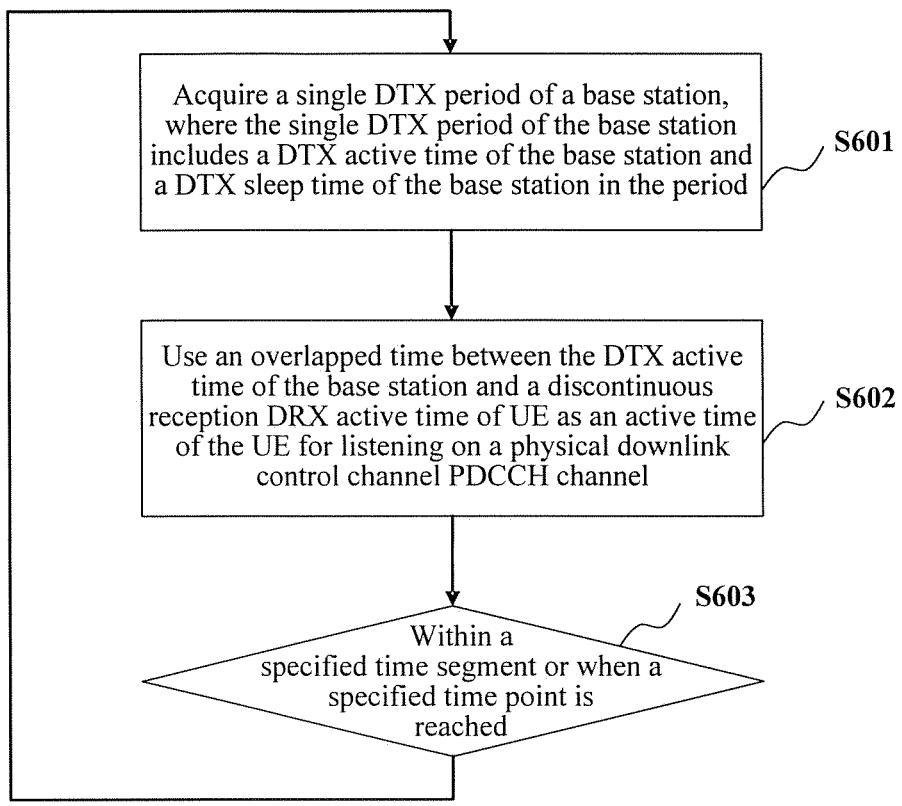
FIG. 6 is a schematic diagram illustrating a method according to Embodiment 3 of the present invention.

FIG. 6 is a flowchart of a method according to Embodiment 3 of the present invention. This embodiment is similar to Embodiment 1, and a difference in detail lies in that in Embodiment 1, the UE knows a DTX condition of the base station before extension, in other words, the UE already knows basic DTX and uses the basic DTX as a basis. In this way, when DTX of the base station is extended, only extension information needs to be notified to the UE. After current extension is complete, the UE may continue to use the previously learned DTX of the UE, that is, the basic DTX of the UE (certainly, adjusted DTX of the UE may also be used) until next extension information is received. It may be considered that this embodiment is less dynamic.

In this embodiment, if a base station has extended DTX, the base station not only sends extension information, but also further directly notifies UE of DTX active and sleep conditions in a unit of a single period in real time or at a fixed time point, and the UE determines an active time of the UE completely according to a received DTX period with reference to DRX of the UE. When the UE needs to learn a next DTX period, at a specified time point or within a specified time segment after or before the current DTX period ends, the UE may continue to acquire a next DTX period of the base station, to form a cycle, so that the UE can learn each DTX period of the base station completely dynamically, that is, learn any extension performed by the base station on DTX. It may be considered that this embodiment uses a completely dynamic mode.

Specifically, this embodiment discloses a method for determining an active time of UE, where the method is applicable to user equipment UE, and includes:

S601: Acquire a single DTX period of a base station, where the single DTX period of the base station includes a DTX active time of the base station and a DTX sleep time of the base station in the period.

To enable each UE served by the base station to receive a single DTX period, the base station may repeatedly send a single DTX period of the base station. Specifically, the base station may send a single DTX period in each subframe, or may repeatedly send a single DTX period periodically an interval of a subframe.

The DTX active time and the DTX sleep time may refer to duration, from a subframe in which acquired current DTX period information of the base station is located, for which an eNB is continuously in a DTX active state and duration for which the eNB enters a DTX sleep state after the active state expires; or may be a total time, in a current DTX period, in which of the base station stays in an active state and a total time, in a current DTX period, in which the base station stays in a sleep state after the active state ends.

S602: Use an overlapped time between the DTX active time of the base station and a discontinuous reception DRX active time of the UE as an active time of the UE for listening on a physical downlink control channel PDCCH channel.

S603: When a specified time point is reached or within a specified time segment, continue to perform S601 to acquire information about a next DTX period of the base station. The specified time point or the specified time segment may be a time point or a time segment after or before a current DTX period ends.

In this embodiment or some other embodiments of the present invention, preferably, the acquiring a single DTX period of a base station may include:

acquiring a single DTX period of the base station in a manner of receiving a Media Access Control MAC control element; or acquiring a single DTX period of the base station in a manner of receiving a radio resource control RRC message; or acquiring a single DTX period of the base station in a manner of receiving a PDCCH command.

Further, preferably, the acquiring a single DTX period of the base station in a manner of receiving a physical downlink control channel PDCCH command includes:

receiving specified configuration information, where the configuration information includes a DTX-RNTI that is configured for the UE and that is used to detect a PDCCH command; or preconfiguring, in the UE, a DTX-RNTI that is used to detect a PDCCH command; and detecting a specified PDCCH command according to the DTX-RNTI, where the specified PDCCH command includes a single DTX period of the base station.

In this embodiment, when a base station extends original DTX of the base station, UE can learn extension performed by the base station, that is, learn a latest DTX condition of DTX, in a manner of acquiring each DTX period of the base station, and therefore can determine a correct active time of the UE with reference to DRX of the UE, thereby ultimately ensuring QoS of the UE.

Embodiment 4

Figure 7:
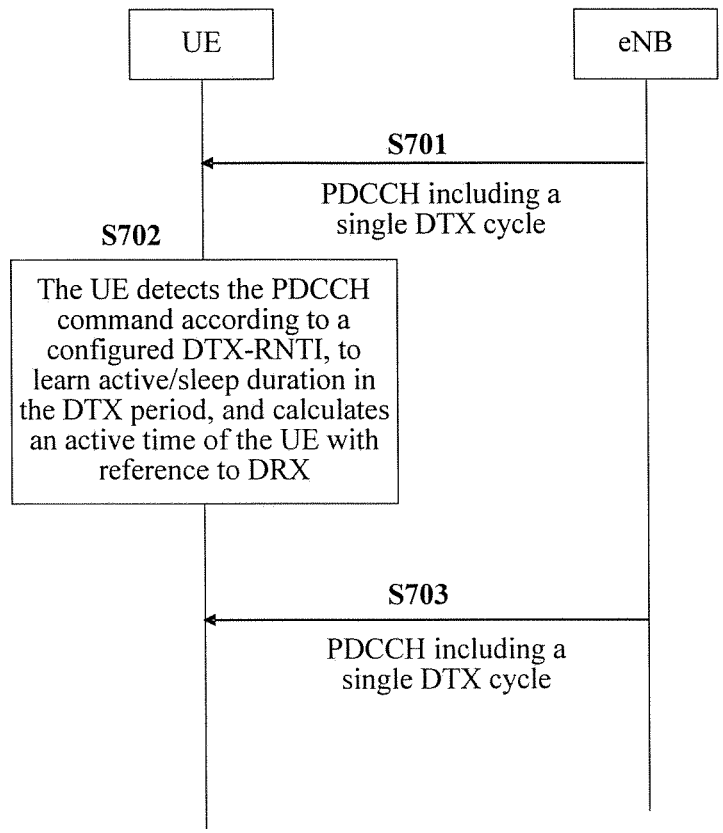
FIG. 7 is a schematic diagram illustrating signaling according to Embodiment 4 of the present invention.

FIG. 7 is a schematic diagram of signaling according to Embodiment 4 of the present invention. This embodiment is based on Embodiment 3, and provides more details about Embodiment 3 with reference to a specific scenario. In this embodiment, an eNB first configures a public DTX-RNTI or preconfigures a same DTX-RNTI for all UE, so that the UE detects a related PDCCH based on the DTX-RNTI, and dynamically learns a single DTX period of the base station according to information carried in the PDCCH. This embodiment may specifically include the following steps:

S701: The UE acquires a PDCCH command that is sent by the eNB and includes a single DTX period. A single DTX period includes an active time/a sleep time in the period. In this step, the eNB may notify the UE of duration, from a current subframe, for which the eNB is continuously in a DTX active state, and duration for which the eNB enters a DTX sleep state after the active state expires; or a total time, in a current DTX period, in which the base station stays in an active state and a total time, in a current DTX period, in which the base station stays in a sleep state after the active state ends.

S702: The UE detects the PDCCH command according to a configured DTX-RNTI, to learn an active time/a sleep time in the single DTX period, and calculates an active time of the UE with reference to DRX. During specific implementation, the eNB may successively send information of each DTX period to the UE, and when the UE needs to determine a next DTX period after a DTX period ends, the UE may select, according to a current time point, a proper DTX period from the successively received information of all the DTX periods, to calculate an active time of the UE.

S703: After a DTX sleep time expires or another preset time point is reached, the UE continues to acquire a PDCCH command that is sent by the eNB and that includes a next DTX period, that is, performs S701 repeatedly. Certainly, a next DTX period may be the same as a previous DTX period, or may be different from a previous DTX period. When a next DTX period is the same as a previous DTX period, in another embodiment of the present invention, the eNB may also not send a same DTX period, and the UE may determine the next DTX period according to the previous DTX period.

In this embodiment, when a base station extends original DTX of the base station, UE can learn extension performed by the base station, that is, learn a latest DTX condition of DTX, in a manner of acquiring each DTX period of the base station, and therefore can determine a correct active time of the UE with reference to DRX of the UE, thereby ultimately ensuring QoS of the UE.

Embodiment 5

This embodiment corresponds to Embodiment 1, and a difference in detail lies in that Embodiment 1 is applicable to a UE side, and this embodiment is applicable to a base station side.

This embodiment provides a method for determining an active time of UE, where the method includes:

sending, by a base station when having extended a discontinuous transmission DTX active time of the base station, extension information of the DTX active time of the base station to the user equipment UE, so that the UE adjusts a DTX active time of the UE according to the extension information, and uses an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE.

Preferably, the extension information includes one or more of an active time extension time point, active time extension duration, an active time extension direction, and interval duration.

Preferably, the sending extension information of the DTX active time of the base station to the user equipment UE includes:

sending the extension information of the DTX active time of the base station in a manner of sending a Media Access Control MAC control element to the user equipment UE; or sending the extension information of the DTX active time of the base station in a manner of sending a radio resource control RRC message to the user equipment UE; or sending the extension information of the DTX active time of the base station in a manner of sending a physical downlink control channel PDCCH command to the user equipment UE.

Preferably, the method may further include the following step of actively waking up, by the UE, the base station:

receiving, by the base station when being in a DTX sleep state, a wake-up message that is sent by the UE; and extending the DTX active time of the base station according to the wake-up message.

In addition, in this embodiment or some other embodiments of the present invention, the method may further include the following step of controlling, by a macro base station, DTX configuration of a micro base station in a unified manner, to reduce interference from the micro base station:

sending, by the base station as a micro base station S-eNB to a macro base station M-eNB, a request for configuring DTX for the S-eNB, where after receiving the request, the M-eNB sends DTX configuration information to the S-eNB for configuring DTX for the S-eNB.

Preferably, the request includes: information about a recommended proportional relationship between DTX active duration and DTX sleep duration.

Preferably, the DTX configuration information includes: active duration and sleep duration in a DTX period of the S-eNB, and a parameter value that is used to determine a start time point of the DTX active duration.

In the foregoing embodiments, it is assumed that DTX is determined by an S-eNB itself. Herein, to further reduce interference between different S-eNBs, and ensure that some S-eNBs can have a sleep time when others S-eNBs work in an active time, to reduce interference between each other, the foregoing step of controlling and coordinating, by an M-eNB, a DTX mode configuration in a unified manner is further provided. The DTX configuration information may also simply be subframe or frame information used by the M-eNB to configure an active time and a sleep time for the S-eNB. For example, subframes 0 to 4 of each radio frame are an active time, and subframes 5 to 9 are a sleep time. The foregoing configuration mode is then repeated in each radio frame. Alternatively, another mode may also be used. For example, the M-eNB may configure odd-numbered subframes or odd-numbered frames of the S-eNB as an active time, and even-numbered subframes or even-numbered frames as a sleep time.

In addition, in this embodiment or some other embodiments of the present invention, the method may further include the following step of determining, by a macro base station, a DRX configuration of the UE based on DTX configuration of a micro base station:

sending, by the base station as a micro base station S-eNB to a macro base station M-eNB, a DTX parameter that is configured for the UE, where the M-eNB configures a DRX parameter for the UE according to the DTX parameter that is configured for the UE.

Preferably, the sending, to a macro base station M-eNB, a DTX parameter that is configured by a micro base station S-eNB for the UE includes:

when learning that the UE is served by the S-eNB and the M-eNB simultaneously, sending, by the S-eNB to the M-eNB, the DTX parameter that is configured by the S-eNB for the UE; or sending, by the S-eNB to the M-eNB according to a request of the M-eNB, the DTX parameter that is configured by the S-eNB for the UE; or when the UE is served by the S-eNB and the M-eNB simultaneously, sending, to the M-eNB, the DTX parameter that is configured by the S-eNB for the UE.

Specifically, if the UE is served by the M-eNB and the S-eNB simultaneously, to better match a DRX configuration when the UE is served by the S-eNB and the M-eNB and a DTX configuration when the UE is served by the S-eNB, a DRX parameter when the UE is served by the S-eNB and the M-eNB may be configured as public DRX, that is, DRX parameter configurations when the UE is served by the S-eNB and the M-eNB are the same. Therefore, a public DRX parameter needs to be configured for the UE with reference to a DTX parameter configuration under the S-eNB. First, the S-eNB notifies the M-eNB of a DTX-related parameter that is configured by the S-eNB for the UE (where it may also be that when the UE is served by the S-eNB and the M-eNB simultaneously and performs data transmission, the UE sends a current DTX parameter configuration in the case of the S-eNB to the M-eNB), which may be specifically that when the S-eNB learns that the UE is served by the S-eNB and the M-eNB simultaneously, the S-eNB actively notifies the M-eNB of the DTX parameter that is configured by the S-eNB for the UE; or the M-eNB first requests the S-eNB to send the DTX parameter, and then the S-eNB sends the DTX parameter of the UE to the M-eNB. Then, the M-eNB configures a suitable DRX parameter for the UE based on the DTX configuration of the UE when served by the S-eNB, where the DRX parameter may be a DRX parameter that is commonly used when the UE is served by the M-eNB and the S-eNB.

In this embodiment of the present invention, when a base station changes original DTX of the base station, extension information of a DTX active time of the base station is sent, so that UE can learn a latest DTX condition according to a change of DTX on a base station side and therefore can determine a correct active time of the UE with reference to DRX of the UE, thereby ultimately ensuring QoS of the UE.

Embodiment 6

This embodiment corresponds to Embodiment 3, and a difference in detail lies in that Embodiment 3 is applicable to a UE side, and this embodiment is applicable to a base station side.

This embodiment provides a method for determining an active time of UE, where the method includes:

sending each discontinuous transmission DTX period of a base station to the user equipment UE, where the DTX period includes a DTX active time of the base station and a DTX sleep time of the base station in the period, so that the UE uses an overlapped time between the DTX active time of the base station and a discontinuous reception DRX active time of the UE as an active time of the UE for listening on a physical downlink control channel PDCCH channel.

Preferably, the sending each DTX period of a base station to user equipment UE includes:

sending each DTX period of the base station in a manner of sending a Media Access Control MAC control element to the user equipment UE; or sending each DTX period of the base station in a manner of sending a radio resource control RRC message to the user equipment UE; or sending each DTX period of the base station in a manner of sending a physical downlink control channel PDCCH command to the user equipment UE.

Similar to Embodiment 5, the method in this embodiment may also further include a step of actively waking up, by the UE, the base station, a step of controlling, by a macro base station, DTX configuration of a micro base station in a unified manner, to reduce interference between micro base stations, and a step of determining, by a macro base station, a DRX configuration of the UE based on a DTX configuration of a micro base station, which are not described in detail herein again.

In this embodiment, when abase station extends original DTX of the base station, each DTX period of the base station is sent to UE, so that the UE can learn extension performed by the base station, that is, learn a latest DTX condition of DTX and therefore can determine a correct active time of the UE with reference to DRX of the UE, thereby ultimately ensuring QoS of the UE.

Embodiment 7

Figure 8:
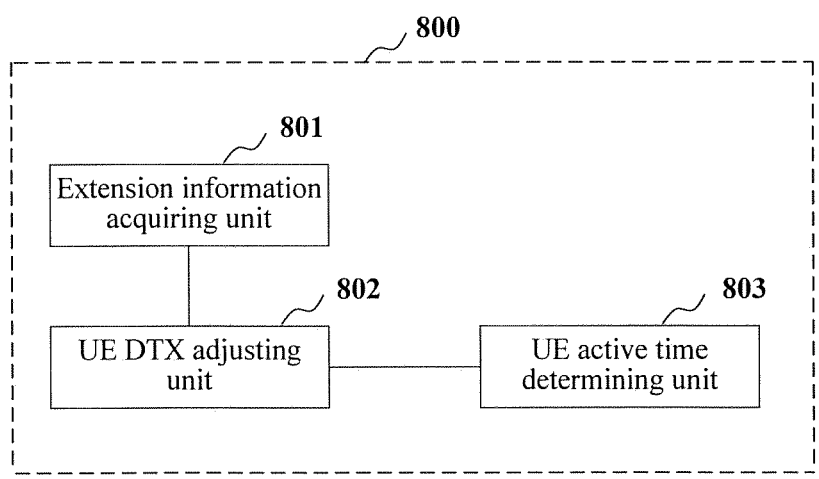
FIG. 8 is a schematic diagram illustrating an apparatus according to Embodiment 7 of the present invention.

FIG. 8 is a schematic diagram of an apparatus according to Embodiment 7 of the present invention. This embodiment corresponds to Embodiment 1, and provides an apparatus 800 for determining an active time of UE, where the apparatus 800 includes:

an extension information acquiring unit 801, configured to acquire extension information of a discontinuous transmission DTX active time of a base station, where the extension information is used to indicate extension performed by the base station on the DTX active time of the base station;

a UE DTX adjusting unit 802, configured to adjust a DTX active time of the UE according to the extension information, where the DTX active time of the UE is the DTX active time of the base station learned by the UE; and a UE active time determining unit 803, configured to use an overlapped time between the DTX active time of the UE and a discontinuous reception DRX active time of the UE as an active time of the UE for listening on a physical downlink control channel PDCCH channel.

Preferably:

the extension information includes an active time extension time point and active time extension duration; and the UE DTX adjusting unit is specifically configured to extend the DTX active time of the UE from the active time extension time point, where an extended length is the active time extension duration.

Preferably, the active time extension time point is received by the UE or preconfigured in the UE, and the active time extension duration is received by the UE or preconfigured in the UE.

Preferably, when both the active time extension time point and the active time extension duration are preconfigured in the UE, the UE DTX adjusting unit is specifically configured to:

extend, according to an extension indicator received by the UE, the DTX active time of the UE from the active time extension time point, where the extended length is the active time extension duration.

Preferably:

the extension information further includes an active time extension direction; and the UE DTX adjusting unit is specifically configured to:

extend the DTX active time of the UE from the active time extension time point along the active time extension direction, where the extended length is the active time extension duration.

Preferably:

the extension information includes interval duration; and the UE DTX adjusting unit is specifically configured to:

after the current DTX active time of the UE ends, make the UE enter a next DTX active time of the UE again after an interval of the interval duration.

Preferably, the extension information acquiring unit includes:

a MAC receiving subunit, configured to acquire the extension information or the extension indicator in a manner of receiving a Media Access Control MAC control element; or an RRC receiving subunit, configured to acquire the extension information or the extension indicator in a manner of receiving a radio resource control RRC message; or a PDCCH receiving subunit, configured to acquire the extension information or the extension indicator in a manner of receiving a physical downlink control channel PDCCH command.

Preferably, when the PDCCH receiving subunit is included, the PDCCH receiving subunit includes:

a configuration information receiving subunit, configured to receive configuration information, where the configuration information includes a discontinuous transmission-radio network temporary identifier DTX-RNTI that is configured for the UE and that is used to detect a PDCCH command; or a configuration information storage subunit, configured to store a preconfigured DTX-RNTI that is used to detect a PDCCH command; and a detection subunit, configured to detect a specified PDCCH command according to the DTX-RNTI, where the specified PDCCH command includes the extension information or the extension indicator.

Preferably, the apparatus further includes:

an extension request sending unit, configured to: when the base station is in a DTX sleep state, determine whether a specified trigger condition is satisfied; and if the specified trigger condition is satisfied, send a wake-up message to the base station to request the base station to extend the DTX active time.

Preferably, the specified trigger condition includes:

an uplink buffer status report UL BSR exceeds a specified threshold; or the UE currently needs to initiate a new service having a high quality of service QoS requirement; or a current service of the UE cannot be delayed to a next DTX active time of the base station.

Preferably, the wake-up message includes:

a scheduling request SR signal sent on a physical uplink control channel PUCCH; or a preamble signal sent on a physical random access channel PRACH.

Because this apparatus embodiment basically corresponds to the method embodiment, for related information, reference may be made to the description in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

In this embodiment of the present invention, when a base station changes original DTX of the base station, UE can learn a latest DTX condition according to a change of the DTX on a base station side in a manner of acquiring extension information of a DTX active time of the base station, and therefore can determine a correct active time of the UE with reference to DRX of the UE, thereby ultimately ensuring QoS of the UE.

Embodiment 8

Figure 9:
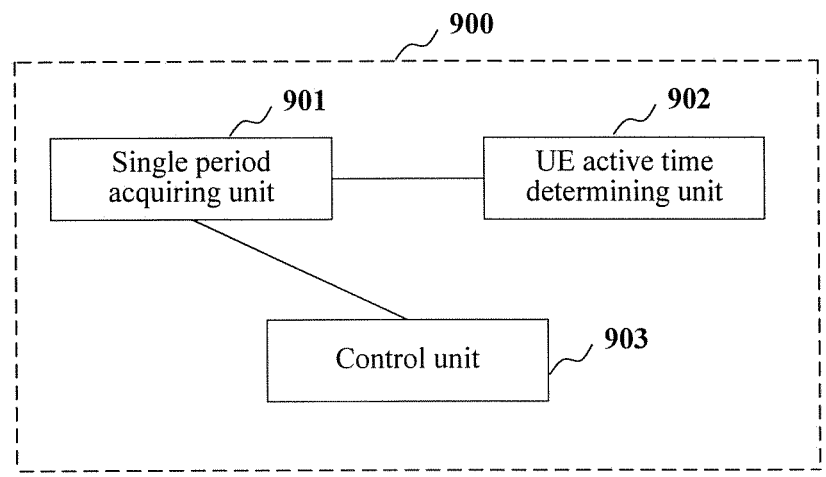
FIG. 9 is a schematic diagram illustrating an apparatus according to Embodiment 8 of the present invention.

FIG. 9 is a schematic diagram of an apparatus according to Embodiment 8 of the present invention. This embodiment corresponds to Embodiment 3, and provides an apparatus 900 for determining an active time of UE, where the apparatus 900 includes:

a single period acquiring unit 901, configured to acquire a single discontinuous transmission DTX period of a base station, where the single DTX period of the base station includes a DTX active time of the base station and a DTX sleep time of the base station in the period;

a UE active time determining unit 902, configured to use an overlapped time between the DTX active time of the base station and a discontinuous reception DRX active time of the UE as an active time of the UE for listening on a physical downlink control channel PDCCH channel; and a control unit 903, configured to: when a specified time point is reached or within a specified time segment, trigger the single period acquiring unit 901 to acquire a next DTX period of the base station.

Preferably, the single period acquiring unit includes:

a MAC receiving subunit, configured to acquire a single DTX period of the base station in a manner of receiving a Media Access Control MAC control element; or an RRC receiving subunit, configured to acquire a single DTX period of the base station in a manner of receiving a radio resource control RRC message; or a PDCCH receiving subunit, configured to acquire a single DTX period of the base station in a manner of receiving a PDCCH command.

Preferably, when the PDCCH receiving subunit is included, the PDCCH receiving subunit includes:

a configuration information receiving subunit, configured to receive configuration information, where the configuration information includes a discontinuous transmission-radio network temporary identifier DTX-RNTI that is configured for the UE and that is used to detect a PDCCH command; or a configuration information storage subunit, configured to store a preconfigured DTX-RNTI that is used to detect a PDCCH command; and a detection subunit, configured to detect a specified PDCCH command according to the DTX-RNTI, where the specified PDCCH command includes a single DTX period of the base station.

Because this apparatus embodiment basically corresponds to the method embodiment, for related information, reference may be made to the description in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

In this embodiment, when a base station extends original DTX of the base station, UE can learn extension performed by the base station, that is, learn a latest DTX condition of DTX, in a manner of acquiring each DTX period of the base station, and therefore can determine a correct active time of the UE with reference to DRX of the UE, thereby ultimately ensuring QoS of the UE.

Embodiment 9

Figure 10:
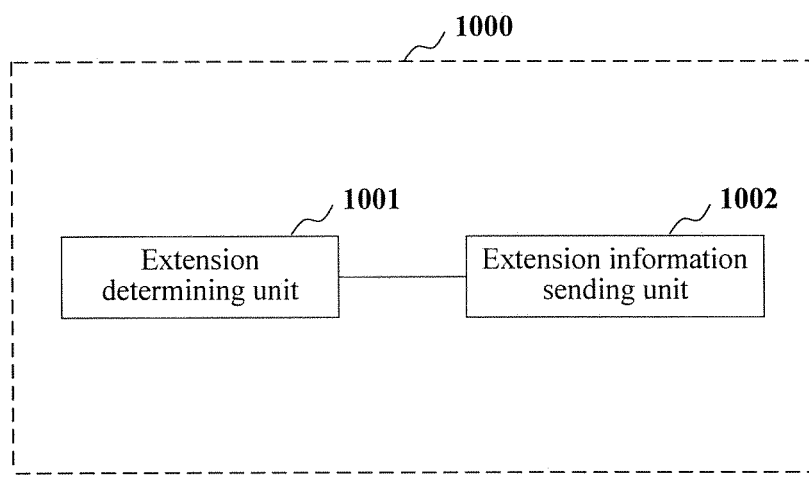
FIG. 10 is a schematic diagram illustrating an apparatus according to Embodiment 9 of the present invention.
Figure 11:
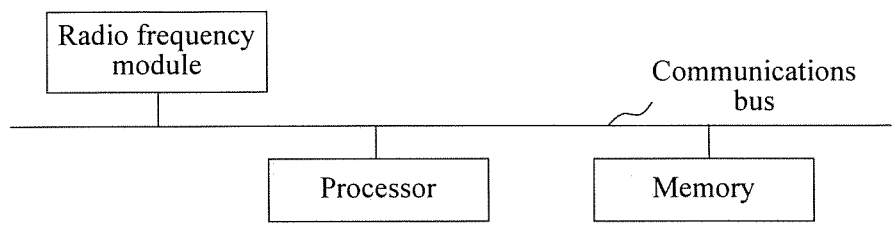
FIG. 11 is a schematic diagram illustrating UE according to Embodiment 11 of the present invention.
Figure 12:
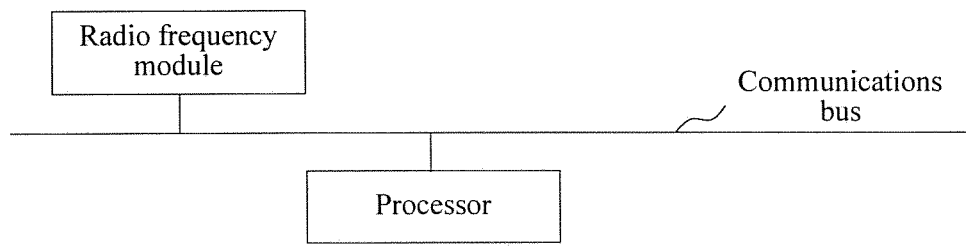
FIG. 12 is a schematic diagram illustrating a base station according to Embodiment 12 of the present invention.

FIG. 10 is a schematic diagram of an apparatus according to Embodiment 9 of the present invention. This embodiment corresponds to Embodiment 5, and provides an apparatus 1000 for determining an active time of UE, where the apparatus 1000 includes:

an extension determining unit 1001, configured to determine whether abase station has extended a discontinuous transmission DTX active time of the base station; and if yes, trigger an extension information sending unit 1002; and the extension information sending unit 1002, configured to send extension information of the DTX active time of the base station to the user equipment UE, so that the UE adjusts a DTX active time of the UE according to the extension information, and uses an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE.

Preferably, the extension information includes one or more of an active time extension time point, active time extension duration, an active time extension direction, and interval duration.

Preferably, the extension information sending unit 1002 includes:

a MAC sending subunit, configured to send the extension information of the DTX active time of the base station in a manner of sending a Media Access Control MAC control element to the user equipment UE; or an RRC sending subunit, configured to send the extension information of the DTX active time of the base station in a manner of sending a radio resource control RRC message to the user equipment UE; or a PDCCH sending subunit, configured to send the extension information of the DTX active time of the base station in a manner of sending a physical downlink control channel PDCCH command to the user equipment UE.

Preferably, the apparatus further includes:

an extension triggering unit, configured to: when the base station is in a DTX sleep state, receive a wake-up message that is sent by the UE; and extend the DTX active time of the base station according to the wake-up message.

Because this apparatus embodiment basically corresponds to the method embodiment, for related information, reference may be made to the description in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

In this embodiment of the present invention, when a base station changes original DTX of the base station, extension information of a DTX active time of the base station is sent, so that UE can learn a latest DTX condition according to a change of DTX on a base station side and therefore can determine a correct active time of the UE with reference to DRX of the UE, thereby ultimately ensuring QoS of the UE.

Embodiment 10

This embodiment corresponds to Embodiment 6, and provides an apparatus for determining an active time of UE, where the apparatus includes:

a DTX period sending unit, configured to send each discontinuous transmission DTX period of a base station to the user equipment UE, where the DTX period includes a DTX active time of the base station and a DTX sleep time of the base station in the period, so that the UE uses an overlapped time between the DTX active time of the base station and a discontinuous reception DRX active time of the UE as an active time of the UE for listening on a physical downlink control channel PDCCH channel.

Preferably, the DTX period sending unit includes:

a MAC sending subunit, configured to send each DTX period of the base station in a manner of sending a Media Access Control MAC control element to the user equipment UE; or an RRC sending subunit, configured to send each DTX period of the base station in a manner of sending a radio resource control RRC message to the user equipment UE; or a PDCCH sending subunit, configured to send each DTX period of the base station in a manner of sending a physical downlink control channel PDCCH command to the user equipment UE.

Because this apparatus embodiment basically corresponds to the method embodiment, for related information, reference may be made to the description in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

In this embodiment, when a base station extends original DTX of the base station, each DTX period of the base station is sent to UE, so that the UE can learn extension performed by the base station, that is, learn a latest DTX condition of DTX and therefore can determine a correct active time of the UE with reference to DRX of the UE, thereby ultimately ensuring QoS of the UE.

Embodiment 11

This embodiment corresponds to Embodiment 1, and discloses user equipment UE, where the UE includes a radio frequency module, a processor, a memory, and a communications bus, where the radio frequency module is configured to receive extension information of a discontinuous transmission DTX active time of a base station, where the extension information is used to indicate extension performed by the base station on the DTX active time of the base station;

the processor is configured to execute a program stored in the memory, where the program includes: adjusting a stored DTX active time of the UE according to the extension information, where the DTX active time of the UE is the DTX active time of the base station learned by the UE; and using an overlapped time between the DTX active time of the UE and a discontinuous reception DRX active time of the UE as an active time of the UE for listening on a physical downlink control channel PDCCH channel;

the memory is configured to store the program, the DTX active time of the UE, and the DRX active time; and the communications bus is configured to connect the radio frequency module, the processor, and the memory.

Because this device embodiment basically corresponds to the method embodiment, for related information, reference may be made to the description in the method embodiment.

In this embodiment of the present invention, when a base station changes original DTX of the base station, UE can learn a latest DTX condition according to a change of the DTX on a base station side in a manner of acquiring extension information of a DTX active time of the base station, and therefore can determine a correct active time of the UE with reference to DRX of the UE, thereby ultimately ensuring QoS of the UE.

Embodiment 12

This embodiment corresponds to Embodiment 5, and provides a base station, where the base station includes a processor, a radio frequency module, and a communications bus, where the processor is configured to determine whether the base station has extended a discontinuous transmission DTX active time of the base station; and if yes, send extension information of the DTX active time of the base station to user equipment UE by using the radio frequency module, so that the UE adjusts a DTX active time of the UE according to the extension information, and uses an overlapped time between the DTX active time of the UE and a discontinuous reception DRX active time of the UE as an active time of the UE for listening on a physical downlink control channel PDCCH channel, where the DTX active time of the UE is the DTX active time of the base station learned by the UE;

the radio frequency module is configured to send the extension information of the DTX active time of the base station to the user equipment UE; and the communications bus is configured to connect the processor and the radio frequency module.

Because this device embodiment basically corresponds to the method embodiment, for related information, reference may be made to the description in the method embodiment.

In this embodiment, when abase station changes original DTX of the base station, extension information of a DTX active time of the base station is sent, so that UE can learn a latest DTX condition according to a change of DTX on a base station side and therefore can determine a correct active time of the UE with reference to DRX of the UE, thereby ultimately ensuring QoS of the UE.

The present invention can be described in the general context of executable computer instructions executed by a computer, for example, a program module. Generally, the program unit includes a routine, program, object, component, data structure, and the like for executing a particular task or implementing a particular abstract data type. The present invention may also be practiced in distributed computing environments in which tasks are performed by remote processing devices that are connected by using a communications network. In a distributed computing environment, program modules may be located in both local and remote computer storage media including storage devices.

A person of ordinary skill in the art may understand that all or a part of the steps of the foregoing method implementation manners may be implemented by a program instructing relevant hardware. The foregoing program may be stored in a computer readable storage medium, where the storage medium mentioned herein is, for example, a ROM, a RAM, a magnetic disk, or an optical disc.

It should further be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely exemplary embodiments of the present invention, but are not intended to limit the protection scope of the present invention. Specific examples are used in this specification to describe the principle and implementation manners of the present invention. The descriptions of the foregoing embodiments are merely intended to help understand the method and core idea of the present invention. In addition, a person skilled in the art may, according to the idea of the present invention, make modifications with respect to the specific implementation manners and the application scope. Therefore, the content of this specification shall not be construed as a limitation to the present application. Any modification, equivalent replacement, or improvement made without departing from the spirit and principle of the present invention shall fall within the protection scope of the present invention.

What is claimed is:

1. A method for determining an active time of user equipment (UE), the method comprising:
   when a base station is in a DTX sleep state, determining whether a specified trigger condition is satisfied; and
   if the specified trigger condition is satisfied, sending a wake-up message to the base station to request the base station to extend a discontinuous transmission (DTX) active time;
   acquiring extension information of the DTX active time of the base station, wherein the extension information is used to indicate extension performed by the base station on the DTX active time of the base station; and
   adjusting a DTX active time of the UE according to the extension information, and using an overlapped time between the DTX active time of the UE and a discontinuous reception (DRX) active time of the UE as an active time of the UE for listening on a physical downlink control channel (PDCCH) channel, wherein the DTX active time of the UE is the DTX active time of the base station learned by the UE.

2. The method according to claim 1, wherein:
   the extension information comprises an active time extension time point and active time extension duration; and
   adjusting a DTX active time of the UE according to the extension information comprises:
     extending the DTX active time of the UE from the active time extension time point, wherein an extended length is the active time extension duration.

3. The method according to claim 2, wherein the active time extension time point is received by the UE or preconfigured in the UE, and the active time extension duration is received by the UE or preconfigured in the UE.

4. The method according to claim 3, wherein when both the active time extension time point and the active time extension duration are preconfigured in the UE, adjusting a DTX active time of the UE according to the extension information comprises:
   extending, according to an extension indicator received by the UE, the DTX active time of the UE from the active time extension time point, wherein the extended length is the active time extension duration.

5. The method according to claim 1, wherein:
   the extension information comprises interval duration; and
   adjusting a DTX active time of the UE according to the extension information comprises:
     after the current DTX active time of the UE ends, entering, by the UE, a next DTX active time of the UE again after an interval of the interval duration.

6. The method according to claim 1, wherein the specified trigger condition comprises:
   an uplink buffer status report (UL BSR) exceeds a specified threshold; or
   the UE currently needs to initiate a new service having a high quality of service (QoS) requirement; or
   a current service of the UE cannot be delayed to a next DTX active time of the base station.

7. The method according to claim 1, wherein the wake-up message comprises:
   a scheduling request (SR) signal sent on a physical uplink control channel (PUCCH); or
   a preamble signal sent on a physical random access channel (PRACH).

8. An apparatus for determining an active time of user equipment (UE), the apparatus comprising:
   a memory; and
   a processor in communication with the memory, wherein the processor is configured to:
     when a base station is in a discontinuous transmission (DTX) sleep state, determine whether a specified trigger condition is satisfied; and
     if the specified trigger condition is satisfied, send a wake-up message to the base station to request the base station to extend a DTX active time;
     acquire extension information of the DTX active time of a base station, wherein the extension information is used to indicate extension performed by the base station on the DTX active time of the base station;
     adjust a DTX active time of the UE according to the extension information, wherein the DTX active time of the UE is the DTX active time of the base station learned by the UE; and
     use an overlapped time between the DTX active time of the UE and a discontinuous reception (DRX) active time of the UE as an active time of the UE for listening on a physical downlink control channel (PDCCH).

9. The apparatus according to claim 8, wherein:
   the extension information comprises an active time extension time point and active time extension duration; and
   the processor is further configured to extend the DTX active time of the UE from the active time extension time point, wherein an extended length is the active time extension duration.

10. The apparatus according to claim 9, wherein the active time extension time point is received by the HE or preconfigured in the UE, and the active time extension duration is received by the UE or preconfigured in the UE.

11. The apparatus according to claim 10, wherein when both the active time extension time point and the active time extension duration are preconfigured in the UE, the processor is further configured to:
   extend, according to an extension indicator received by the UE, the DTX active time of the UE from the active time extension time point, wherein the extended length is the active time extension duration.

12. The apparatus according to claim 9, wherein the processor is further configured to:
   acquire the extension information or the extension indicator in a manner of receiving a MAC control element; or
   acquire the extension information or the extension indicator in a manner of receiving an RRC message; or
   acquire the extension information or the extension indicator in a manner of receiving a PDCCH command.

13. The apparatus according to claim 8, wherein:
   the extension information comprises interval duration; and
   the processor is further configured to:
     after the current DTX active time of the UE ends, make the UE enter a next DTX active time of the UE again after an interval of the interval duration.

14. The apparatus according to claim 8, wherein the specified trigger condition comprises:
- an uplink buffer status report (UL BSR) exceeds a specified threshold; or
- the UE currently needs to initiate a new service having a high quality of service (QoS) requirement; or
- a current service of the UE cannot be delayed to a next DTX active time of the base station.

15. An apparatus for determining an active time of user equipment (UE), the apparatus comprising:
- a memory; and
- a processor in communication with the memory, wherein the processor is configured to:
- acquire extension information of a discontinuous transmission (DTX) active time of a base station, wherein the extension information is used to indicate extension performed by the base station on the DTX active time of the base station and comprises an active time extension time point and active time extension duration, wherein acquiring the extension information comprises
  - acquiring the extension information in a manner of receiving a MAC control element, or
  - acquiring the extension information in a manner of receiving an RRC message, or
  - acquiring the extension information in a manner of receiving a physical downlink control channel (PDCCH) command;
- adjust a DTX active time of the UE according to the extension information, wherein the DTX active time of the UE is the DTX active time of the base station learned by the UE;
- extend the DTX active time of the UE from the active time extension time point, wherein an extended length is the active time extension duration;
- use an overlapped time between the DTX active time of the UE and a discontinuous reception (DRX) active time of the UE as an active time of the UE for listening on a PDCCH;
- receive configuration information, wherein the configuration information comprises a discontinuous transmission-radio network temporary identifier (DTX-RNTI) that is configured for the UE and that is used to detect a PDCCH command; or store a preconfigured DTX-RNTI that is used to detect a PDCCH command; and
- detect a specified PDCCH command according to the DTX-RNTI, wherein the specified PDCCH command comprises the extension information.

* * * * *